United States Patent [19]
Tichiaz et al.

[11] Patent Number: 5,257,685
[45] Date of Patent: Nov. 2, 1993

[54] PAWL AND RATCHET CLUTCH WITH SHIFTING PAWL

[75] Inventors: Gordon D. Tichiaz, Avon, Conn.; Robert Telakowski, Fairlawn, N.J.

[73] Assignee: United Technologies Corporation, Hartford, Conn.

[21] Appl. No.: 847,768

[22] Filed: Mar. 5, 1992

[51] Int. Cl.⁵ ..................... F16D 41/12; F16D 43/04; F02N 15/00

[52] U.S. Cl. ..................... 192/46; 74/7 C; 192/42; 192/104 C

[58] Field of Search ........... 192/42, 46, 104 C, 103 B, 192/63, 71; 74/7 C, 576; 60/39.142

[56] References Cited

U.S. PATENT DOCUMENTS

| | | | |
|---|---|---|---|
| 1,767,593 | 6/1930 | Laabs | 192/46 X |
| 2,028,441 | 1/1936 | Decker | 192/71 X |
| 2,054,747 | 9/1936 | Green et al. | 192/46 X |
| 3,236,348 | 2/1966 | Okcuoglu | 192/71 |
| 3,727,733 | 4/1973 | Mrazek | 192/46 X |
| 4,050,560 | 9/1977 | Tostenfelt | 192/47 X |
| 4,126,214 | 11/1978 | Kiss | 192/46 X |
| 4,187,728 | 2/1980 | Mazzorana | 74/6 |
| 4,899,534 | 2/1990 | Sorenson | 192/47 X |
| 4,914,906 | 4/1990 | Burch | 192/42 X |
| 4,926,631 | 5/1990 | Sorenson | 192/47 X |

FOREIGN PATENT DOCUMENTS 869052  5/1961  United Kingdom ............... 192/46

Primary Examiner—Rodney H. Bonck
Attorney, Agent, or Firm—William W. Habelt

[57] ABSTRACT

A pneumatic starter (10) incorporates a pawl and ratchet clutch assembly (50) having a ratchet member (46) mounted to a drive member (40) powered by an air expansion turbine (20), and a plurality of pawls (48) disposed circumferentially about the ratchet member (46) and operable in engagement therewith to transmit rotational drive torque from the drive member (40) to a driven member (60). Each of the pawls (48) is supported on a pivot pin (54) for pivotal movement into and out of engagement with the ratchet member (46) and translation between a engaged and drive position and a disengaged and retracted position to effectuate a change in the location of the center of gravity (93) of the pawl relative to its pivot axis (55). Preload springs (54) are provided for biasing the pawls (48) to pivot radially inwardly into engagement with the ratchet member (46). A torsion spring (82) is disposed in operative association with each pawl (48) for shifting its associated pawl from its engaged and drive position to its disengaged and retracted position upon lift-off of the pawl from the ratchet member.

3 Claims, 3 Drawing Sheets

PAWL AND RATCHET CLUTCH WITH SHIFTING PAWL

TECHNICAL FIELD

The present invention relates generally to pawl and ratchet clutches for use on unidirectional drive systems, and more particularly a pawl and ratchet clutch suitable for use in a starter for starting engines, such as aircraft turbine engines.

BACKGROUND ART

Pawl and ratchet clutches are often utilized in unidirectional drive systems for transmitting drive torque from a drive shaft to a driven shaft. For example, starters of the type commonly used to start engines, in particular the turbine engines of modern gas turbine powered aircraft often employ a pawl and ratchet type clutch which functions to transmit rotational drive torque from a drive shaft of the starter to drive the engine being started to starting speed. One type of starter often employing a pawl and ratchet clutch is the pneumatic starter, also known as an air turbine starter, such as disclosed, for example, in U.S. Pat. Nos. 3,727,733; 4,899,534; 4,914,906; and 4,926,631.

A pawl and ratchet clutch of type commonly used in such pneumatic starters includes a toothed ratchet member mounted on a central drive shaft and a plurality of pivotal pawls supported from and rotating with a driven output shaft disposed coaxially about the drive shaft. The pawls are operatively disposed at circumferentially spaced intervals about the ratchet member in cooperative relationship therewith. Each pawl is biased to pivot radially inwardly by a leaf spring operatively associated therewith to engage a tooth of the ratchet member thereby coupling the drive shaft in driving relationship to the driven output shaft so long as the pawls remain engaged with the teeth of the ratchet member. The drive shaft is connected, either directly or through suitable reduction gearing as desired, to the shaft of the pneumatic starter turbine, which is powered by extracting energy from a flow of pressurized fluid passed through the turbine of the starter.

To start the turbine engine, the output end of the driven output shaft of the starter is connected, for example by mating splines, to an engine shaft operatively connected to the main engine shaft through a gear box, and pressurized fluid, typically compressed air, is passed through the turbine of the pneumatic starter. As the starter turbine extracts energy from the compressed air passing therethrough, the drive shaft of the starter turbine is rotated to in turn rotatably drive the output shaft of the starter, and consequently the turbine engine shaft connected thereto, through the engagement of the pawls pivotally mounted to the output shaft with the ratchet member mounted to the drive shaft. Typically, the starter is designed to accelerate the engine shaft from zero to a predetermined cut-off speed, typically of about 5000 revolutions per minute, in about one minute or less.

Once engine light-off has occurred and the engine shaft is rotating at the desired cut-off speed, the flow of pressurized air to the starter turbine is terminated. With the flow of pressurized air to the starter turbine shut-off, the drive shaft of the starter rapidly slows down. Consequently, the ratchet member mounted to the starter drive shaft also rapidly slows down, while the pawls supported from the starter output shaft continue to rotate with the engine of the operating turbine engine at the relatively high cut-off speed. The pawls become disengaged from the ratchet member when the rotational speed of the output shaft exceeds a threshold speed whereat the pawls lift-off of the ratchet member, that is pivot radially outwardly out of contact with the teeth of the ratchet member, under the influence of the centrifugal forces acting thereon due to the continued rotation of the pawls at the relatively high speed of the engine shaft and remain disengaged from the ratchet member so long as the rotational speed of the engine shaft remains high enough that the centrifugal forces acting on the pawls exceed the opposing moment imposed on the pawls by the force of their associated bias springs.

When the turbine engine is later shut-down, the operating speed of the engine shaft of the turbine engine to which the output shaft of the starter is connected rapidly decreases as the turbine engine spools down. As the starter shaft slows down, the centrifugal force on the pawls consequently decreases and the force of each bias spring progressively pivots its associated pawl radially inwardly again toward the ratchet member until each pawl reengages a ratchet tooth on the non-rotating ratchet member so as to reengage the clutch. The speed at which the reengagement of the pawls with the ratchet member occurs, commonly referred to as the reengagement speed, is less than the pawl lift-off speed by an amount commonly referred to as the clutch hysteresis.

In prior art pawl and ratchet clutches, pawl reengagement often occurs at too high of a rotational speed, which results in the pawls undesirably ratcheting along the teeth of the ratchet member before becoming engaged therewith. Such ratcheting causes undesirable wear of the pawls and teeth of the clutch, necessitating premature repair or replacement of the clutch assembly. Additionally, the repeated bouncing of the pawls during ratcheting can set up an undesirable vibration in the starter which can detrimentally impact bearings, gears and shaft members throughout the starter. It would be desirable, therefore, to delay reengagement of the pawls with the ratchet teeth until the rotational speed of the driven shaft has slowed to a lower speed at which the occurrence of such ratcheting is eliminated or at least substantially reduced, thereby reducing wear on and increasing the service life of the clutch assembly.

DISCLOSURE OF INVENTION

It is an object of the present invention to provide a pawl and ratchet clutch wherein the reengagement of the pawls with the ratchet teeth during spool down is delayed until a relatively lower rotational speed is reached at which the occurrence of pawl ratcheting is eliminated or at least substantially reduced, thereby reducing wear on and increasing the service life of the clutch assembly.

It is a further object of the present invention to provide a pawl and ratchet clutch having pawls which shift position after lift-off so as to delay the reengagement of the pawls with the ratchet teeth during spool down, thereby reducing the magnitude of the reengagement speed.

It is an object of a particular embodiment of the present invention to provide a pawl and ratchet clutch having a plurality of pivotal pawls which are slidable relative to their respective pivot pins and having spring means operatively associated with each pawl for repositioning each pawl after lift-off from the ratchet.

The pawl and ratchet clutch assembly of the present invention includes ratchet means mounted to a drive member, and a plurality of pivotal pawls disposed circumferentially about the ratchet means, each pawl being mounted about a pivot pin not only for pivotal movement into and out of engagement with the ratchet means, but also for generally circumferential translational movement relative to its pivot pin. The pawls are operable when in engagement with the ratchet means to transmit rotational drive torque from the driving member to a driven member on which the pawls are supported. First spring means are provided for biasing the pawls to pivot radially inwardly into engagement with the ratchet member. Further in accordance with the present invention, second spring means are provided in operative association with each pawl for repositioning the pawl when its becomes disengaged from the ratchet means upon pawl lift-off. The repositioning spring means is advantageously disposed to act upon a heel portion of the pawl so as to urge the pawl to translate relative to its pivot pin after lift-off, thereby shifting the center of gravity of the pawl relative to its pivot axis such that reengagement of the repositioned pawl with the ratchet means will occur at a lower rotational speed.

DESCRIPTION OF THE DRAWINGS

The aforementioned and other objects, features and advantages of the present invention will become more apparent in light of the following detailed description of the invention and the embodiment thereof illustrated in the accompanying drawing, wherein.

BEST MODE FOR CARRYING OUT THE INVENTION

Figure 1:
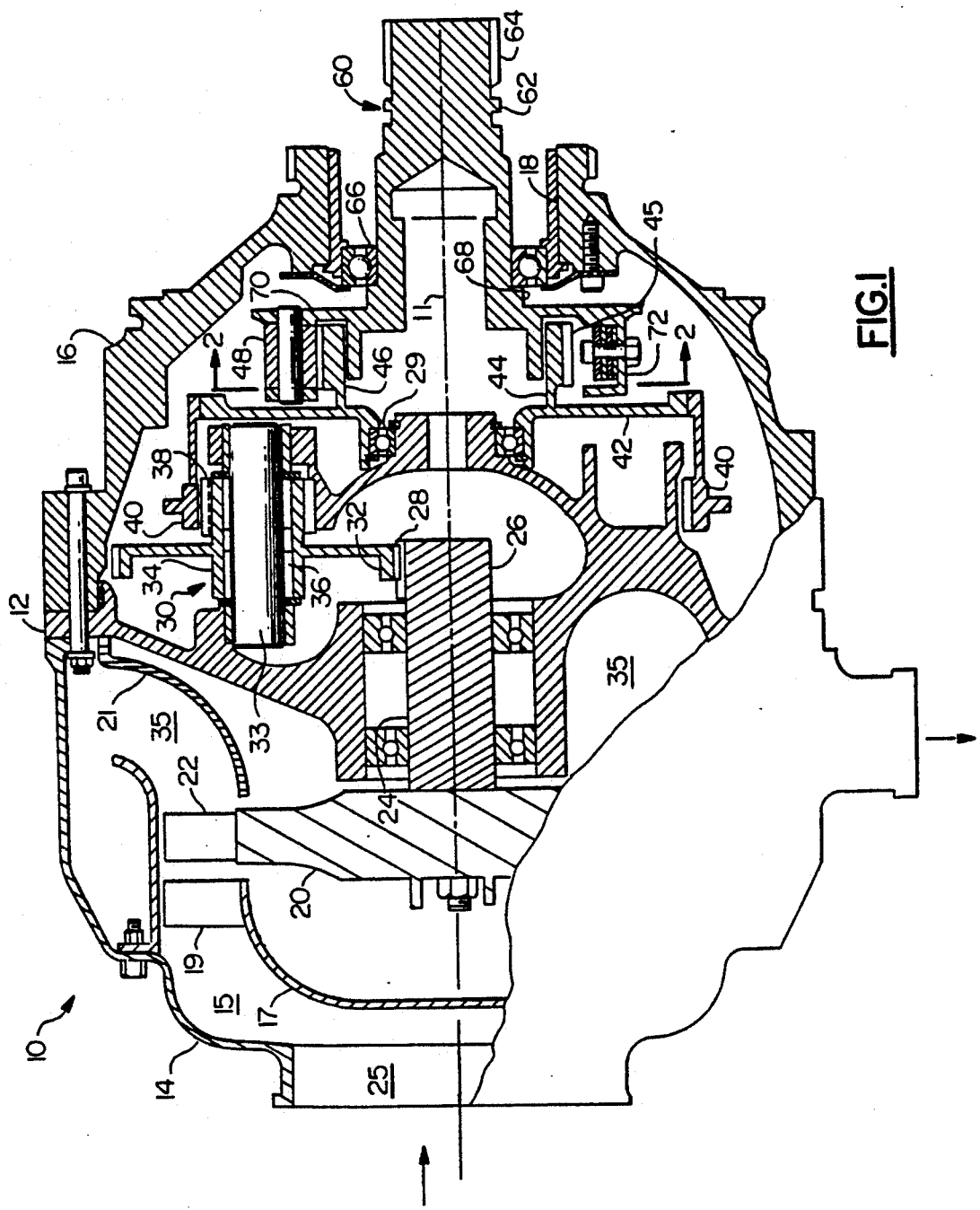
FIG. 1 is a partially-sectioned side elevational view of a pneumatic starter having a pawl and ratchet assembly incorporating pawls adapted to reposition after lift-off.

Referring now to FIG. 1, there is depicted therein a pneumatic starter 10 of the general type often utilized to start gas turbine engines, such as for example aircraft turbine engines. The pneumatic starter 10, also known as an air turbine starter, includes a turbine wheel 20 which is driven by a compressed gas, most commonly compressed air from an external supply, passing therethrough so as to extract energy from the gas and convert the extracted energy to mechanical energy in a manner well known in the art. Although the present invention is described herein with reference to an air turbine starter, it is to be understood that the pawl and ratchet assembly of the present invention has application on any unidirectional drive system wherein a pawl and ratchet clutch is utilized to transmit rotation from a driving shaft to a driven shaft.

The pneumatic starter 10 has a gear housing 12 disposed between and mounted to an inlet housing 14 and a transmission housing 16. The inlet housing 14 defines a flow chamber 15 having an axial flow inlet 25 and an annular flow outlet 35. Disposed within the flow chamber 15 intermediate therebetween is turbine wheel 20 having a plurality of blades 22 disposed about its outer circumference and a central axially extending shaft 24. The turbine wheel 20 is mounted to its shaft 24 such that the shaft 24 is driven in rotation about its axis as the turbine wheel 20 is caused to rotate by the compressed air supplied from an external source thereof to the flow inlet 25 and passing through the turbine blades 22 to the flow outlet 35. A turbine shield 17, having a plurality of stator vanes 19 disposed circumferentially thereabout, may be disposed within the flow chamber 15 upstream of the turbine wheel 20 to ensure that the incoming compressed air is properly directed through the turbine blades 22 in a desired manner. A flow deflector 21 may be disposed downstream of the turbine wheel 20 to direct the exhaust air from the blades 22 to the flow outlet 35.

The energy extracted from the compressed air via the turbine wheel 20 is transmitted through the turbine shaft 24 to drive one or more transmission gear assemblies 30, for example three transmission gear assemblies disposed at equal circumferentially spaced intervals about the end 26 of the turbine shaft 24. Each gear assembly 30 comprises a drive gear 32 on one end of a central support shaft 34 rotatably supported via bearing means 36, for example roller bearings, on a stationary shaft 33, and a pinion gear 38 also provided on the support shaft 34 on the other end thereof. Advantageously, the drive gear 32, the pinion gear 38 and support shaft 34 may be formed as a single integral member. The drive gear 32 of each gear assembly 30 is operatively connected via intermeshing teeth members to a sun gear 28 provided on end 26 of the turbine shaft 24 and the pinion gear 38 of each gear assembly 30 is operatively connected via intermeshing teeth members to a ring gear 40.

The ring gear 40 is carried on and extends axially inwardly from the outer circumference of a radially extending central support member 42 which is rotatably supported on bearings 29 carried on a central strut of the gear housing 12. Also carried by the central support member 42 is a cylindrical flange member 44 which extends coaxially outwardly therefrom about the axis 11. The cylindrical flange member 44 has a plurality of rake teeth 45 formed on its outer circumference so as to form a ratchet member 46 which in cooperation with pawls 48 forms a pawl and ratchet clutch assembly 50.

Figure 3:
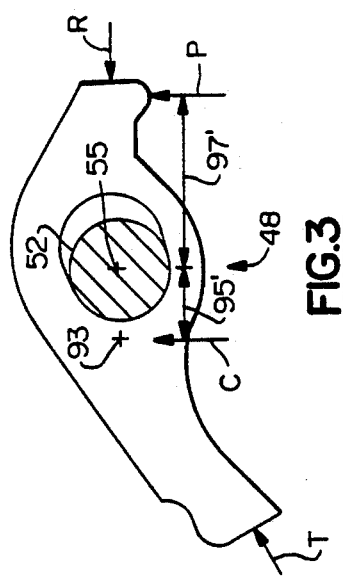
FIG. 3 is a force and moment diagram of a pawl of the pawl and ratchet assembly of FIG. 2.
Figure 2:
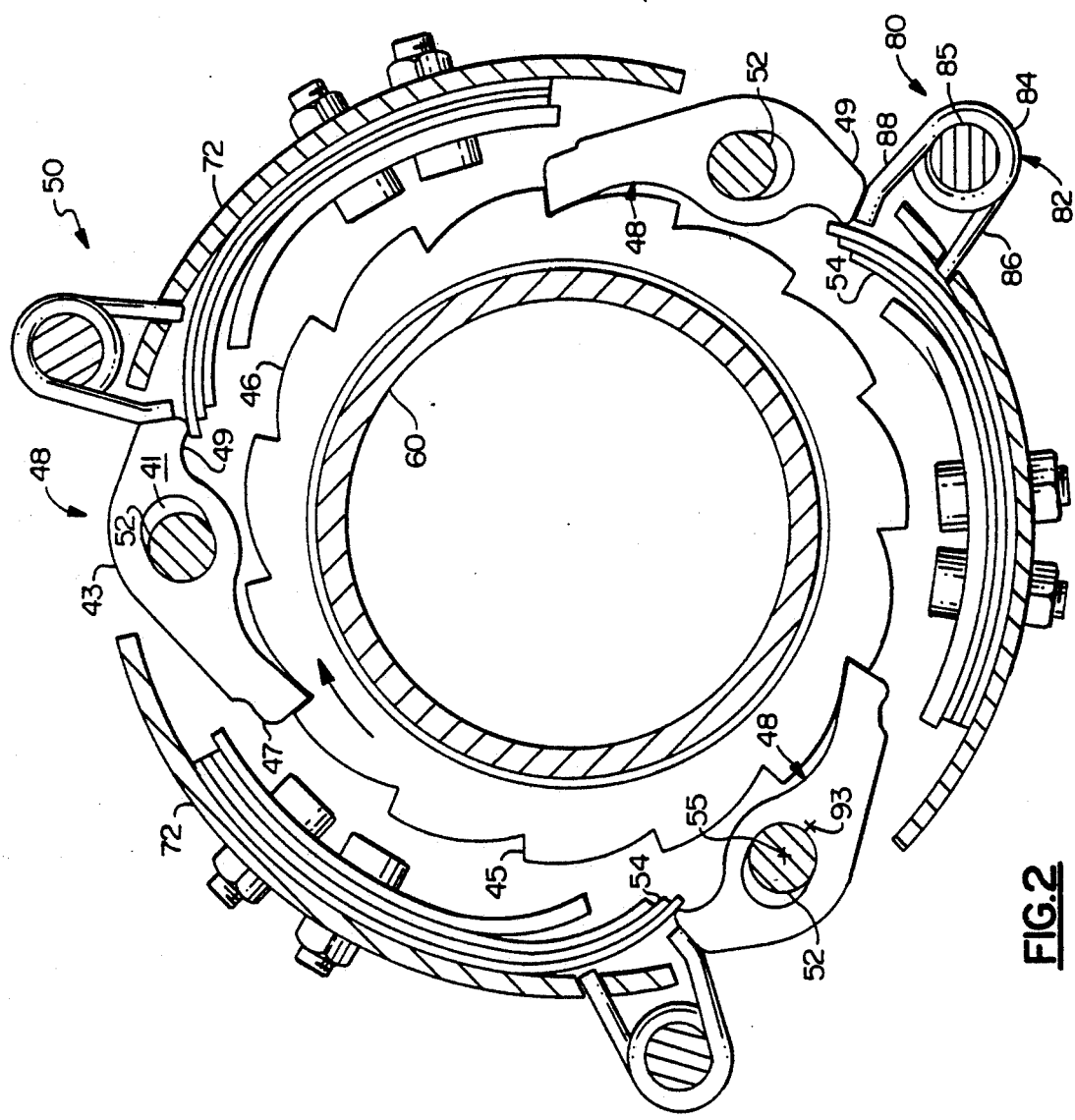
FIG. 2 is a sectional side elevational view of the pawl and ratchet assembly of the present invention taken along line 2—2 of FIG. 1 showing the pawls engaged with the ratchet member.

Extending axially outwardly through a central opening 18 in the transmission housing section 16 of the starter 10 and coaxially along the axis 11 thereof, is an output shaft 60 which has a distal end 62 provided with means, such as for example splines 64, for engaging an engine shaft (not shown) in the gear box of the turbine engine (not shown) on which the starter 10 is utilized to start the turbine engine. The output shaft 60 is rotatably supported on bearing means 66 disposed in the central opening 18 and carried on housing section 16. The aforementioned pawls 48, of which there are typically three, are supported on a clutch carrier 70 which extends radially outward from the output shaft 60 at the proximal end 68 thereof. As best illustrated in FIGS. 2 and 3, each of the pawls 48 is pivotally supported on a shaft 52 mounted to and extending axially from the support flange 70 such that the pawls are disposed in cooperation with the ratchet member 46 at equally spaced intervals about the circumference of and in radially spaced relationship from the ratchet member 46.

Additionally, each of the pawls 48 is biased to pivot about its support shaft 52 to rotate the toe end 47 thereof radially inwardly towards the ratchet member 46 under the force of a bias spring 54 mounted to an axial flange portion 72 of the clutch carrier 70. Each bias spring 54 may comprise a leaf spring operatively bearing against the heel end 49 of its associated pawl so as to, in a manner well known in the art, function during operation of the starter 10 to load the toe end 47 of its associated pawl 48 into engagement with the teeth of the ratchet member 46 of the pawl and ratchet clutch to ensure transmission of torque from the ring gear 40 to the output shaft 60 until the output shaft 60 has reached a relatively high desired cut-off speed, for example about 5000 rpm, at which the pawls 48 pivot away from the ratchet member 46 under the influence of centrifugal force after disengagement from the teeth 45 of the ratchet member 46 upon slowing down of the ratchet member 46 after termination of the flow of compressed air through the starter turbine 20. It is to be understood, however, that the bias spring means is not limited to leaf springs bearing upon the heel portion of the pawl, but may comprise any spring means suitably configured and disposed for biasing the toe portion of the pawl 48 radially inwardly toward the ratchet member 46.

When the pawls 48 are engaged with the teeth of the ratchet 46 during operation of the starter 10, the output shaft 60 of the starter, and the engine shaft of the turbine engine connected therewith, are driven in rotation by the ring gear 40 through the engaged pawl and ratchet clutch. The ring gear 40 is driven in rotation about axis 11 by the energy extracted from the compressed air passing through the blades 22 of the turbine wheel 20 via transmission of the rotational torque imparted to the shaft 24 of the turbine wheel 20 through the sun gear 28 to the drive gears 30 and therefrom through the pinion gears 38 to the ring gear 40.

After the shaft of the turbine engine engaged with the output shaft 60 of the starter 10 has reached the preselected desired engine speed, the flow of compressed air to and through the turbine wheel 20 is shut off. As a result, drive power is no longer being delivered to the ratchet member 46 through the drive gears 30 and ring gear 40. Consequently, the ratchet member 46 slows down and its rotational speed rapidly decreases, while the output shaft 60 of the starter 10 and the pawls 48 mounted thereto continue to rotate at the higher engine speed, thereby causing the pawls 48 to become disengaged from the ratchet member 46 and pivot away from the ratchet member 46 as hereinbefore discussed.

When the turbine engine is later shut down, the starter output shaft 60 begins to slow down and its rotational speed steadily decreases as the turbine engine spools down. As the output shaft 60 coasts down, the centrifugal force acting on the pawls 48 so as to urge the toe ends 47 of the pawls 48 radially outwardly steadily decreases and the toe end 47 of each pawl 48 begins to pivot radially inwardly toward the ratchet member 46 under the bias force applied by the springs 54 on the heel ends 49 of the pawls 48 until the toe ends 47 of the pawls 48 re-engage with the teeth of the ratchet member 46.

Figure 5:
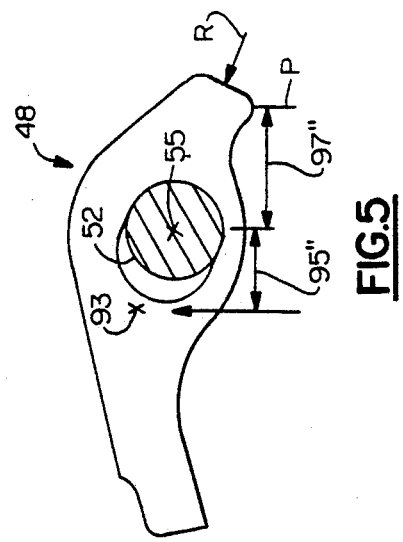
FIG. 5 is a force and moment diagram of a pawl of the pawl and ratchet assembly of FIG. 4.
Figure 4:
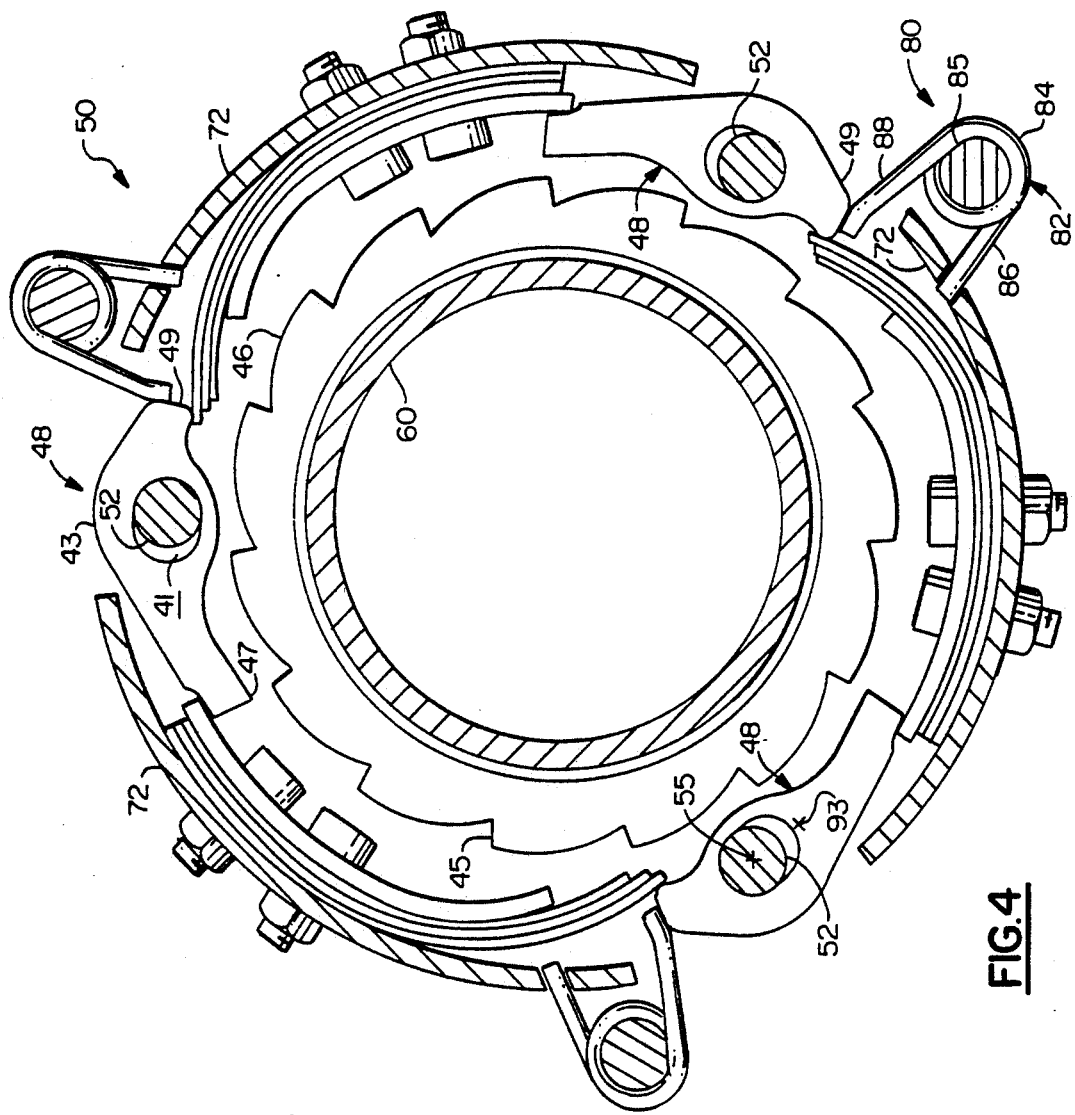
FIG. 4 is a sectional side elevational view of the pawl and ratchet assembly of the present invention taken along line 2—2 of FIG. 1 showing the pawls disengaged from the ratchet member and repositioned.

In accordance with the present invention, each of the pawls 48 is adapted to translate circumferentially after lift-off from the ratchet member 46 so as to shift its center of gravity 93 to a position farther away from its pivot axis 55. When the pawls 48 are engaged with the ratchet member 46, as depicted in FIGS. 2 and 3, the center of gravity 93 of each pawl 48 is positioned relatively closer to its pivot axis 55 extending through its pivot pin 52. Once the pawls have been disengaged from the ratchet member 46 due to lift-off, each pawl is translated circumferentially with respect to its pivot pin 52, thereby repositioning its center of gravity 93, as depicted in FIGS. 4 and 5, to a position further away from its pivot axis 55 extending through its pivot pin 52. As a result of this post lift-off repositioning of the pawls 48, the moment arm of the preload force applied upon the heel of each pawl 48 by its associated bias spring 54 decreases, while the moment arm of the centrifugal force acting upon each pawl through its center gravity increases.

For example, in the illustrated embodiment of the present invention, the moment arm from the spring preload force P on the heel 49 of each pawl 48 to its pivot axis 55 when the pawls 48 are disposed in an engaged and drive position, as illustrated in FIGS. 2 and 3, has a first length 97', which is reduced upon shifting of the pawls 48 to a disengaged and retracted position, as illustrated in FIGS. 4 and 5, to a shorter second length 97", while the moment arm from the centrifugal force acting on each pawl through its center of gravity 93 to its pivot axis 55 on the engaged pawls has a first length 95' which is increased upon shifting to a disengaged and retracted position to a longer second length 95". With the pawls in their disengaged and retracted position, the preloading moment created by the preload spring 54 acting through the shorter moment arm 97", which acts to bias the toe portion 47 of the pawl 48 to pivot radially inwardly toward the ratchet member 46, is reduced to a magnitude which lesser than that of the preloading moment imposed upon the pawl 48 after the pawl shifts upon lift-off by the spring preloading force acting through the longer moment arm 97'. Conversely, with the pawl in its disengaged and retracted position, the centrifugal moment created by the centrifugal force C acting on the pawl 48 through a longer moment arm 95", which acts in opposition to the preload moment to pivot the toe portion 47 of the pawl radially outwardly, is increased. Consequently, the pawls 48 will not pivot into reengagement from their disengaged and retracted position until the speed of rotation of the output shaft 60 has decreased to a relatively lower rotational speed whereat the centrifugal force has been reduced to a level at which the spring preload force, despite acting through a shorter moment arm, creates a moment acting so as to pivot the toe portion 47 of the pawl 48 radially inwardly, which moment overcomes the opposing moment generated by the reduced centrifugal force on the pawl.

In the depicted embodiment of the present invention, each pawl 48 has an elongated pivot slot 41 provided in a central body portion 43 thereof extending between the toe portion 47 and the heel portion 49 thereof. The elongated slot 41 is adapted to receive the pivot pin 52 for pivotally supporting the pawl 48 and accommodating shifting of the pawl 48 relative to the pivot pin 52 received in the slot 41 in a generally circumferential translation between a first position, referred to as its engaged and drive position, wherein the pivot pin 52 bears on the end of the slot 41 nearest the toe portion of the pawl as illustrated in FIGS. 2 and 3, and a second position, referred to as its disengaged and retracted position, wherein the pivot pin 52 bears on the other end of the slot 41 nearest the heel portion of the pawl as illustrated in FIGS. 4 and 5.

To effect shifting of the pawls 48 to their disengaged and retracted position as desired after lift-off, there is provided in operative association with each pawl 48, means 80 for repositioning the pawl 48 from its engaged and drive position to its disengaged and retracted position upon disengagement of the toe 47 of the pawl from the teeth 45 of the ratchet member 46. Each pawl repositioning means 80 may, for example, comprise a torsion spring 82 having a coiled body 84 disposed about a support pin 85 extending outwardly from the pawl support member 70, a first leg 86 extending from one end of the coiled body and secured to extension flange 72 so as to restrain lateral movement thereof, and a second leg 88 extending from the other end of the coiled body and bearing against the heel portion 49 of its associated pawl 48. It is to be understood, however, that the pawl repositioning means 80 of the pawl and ratchet clutch assembly of the present invention may comprise means other than a torsion spring, such as for example a leaf spring, a coil spring or the like.

When the pawl and ratchet clutch assembly 50 is engaged, that is with the toe portion 47 of each pawl 48 engaged with the teeth 45 of the ratchet member 46, the drive torque T being transmitted through the pawls 48 from the driven ratchet member 46 to the output shaft 60 acts upon the pawls 48 to translate each pawl to its engaged and drive position. Thus, when the pawls 48 are engaged with the ratchet member 46, each pawl bears against the second leg 88 of its associated positioning spring 82 thereby compressing the coiled body 84 thereof. Upon lift-off of the pawls 48 from the ratchet member 46, the drive torque is eliminated, whereupon the second leg 88 of body 84 of torsion spring 82 flexes outwardly and consequently pushes against the heel portion 49 of the pawl 48, whereby the pawl 48 is caused to shift along its pivot pin 52 to its disengaged and retracted position.

Once shifted to their disengaged and retracted positions under the force R of their respective positioning means 80, the pawls 48 remain thereat in disengagement until the rotational speed of the output shaft 60 has slowed to a relatively low speed at which the pivoting moment acting on the each pawl 48 as a result of the centrifugal forces thereon has decreased to such a low magnitude that the moment imposed upon each pawl 48 by its associated preload spring 54 overcomes the opposing moment and causes each pawl 48 to pivot radially inwardly to engage the ratchet member 46. Upon application of drive torque, the ratchet teeth 45 engaged with the toe portions 47 of the pawls 48 drive the heel portions 49 of the pawls 48 against the second leg 88 of their associated torsion springs 82, thereby again compressing the torsion springs and shifting the pawls to their engaged and drive position, whereat each pawl will remain until lift-off is again experienced.

Although the invention has been shown and described with respect to a best mode embodiment exemplary thereof, it should be understood by those skilled in the art that various modifications, changes, omissions and additions in the form and detail thereof may be made without departing from the spirit and scope of the invention.

We claim:

1. A pawl and ratchet clutch assembly for use in transmitting rotational drive torque from a driving member to a driven member, said pawl and ratchet clutch assembly comprising ratchet means mounted to the drive member, a plurality of pawls mounted to a support member connected to the driven member and disposed circumferentially about said ratchet means and operable in engagement therewith to transmit the rotational drive torque from the driving member to the driven member, each of said pawls having a toe portion, a heal portion, and an elongated slot disposed therebetween, each pawl being supported on a pivot pin extending into said slot for pivotal movement of the toe portion thereof into and out of engagement with said ratchet means and for translation along said slot relative to its pivot pin from a first position whereat the toe portion is rotated inwardly into engagement with said ratchet means to a second position when disengaged whereat the toe portion is rotated outwardly and retracted from said ratchet means, preload means for biasing said pawls to pivot radially inwardly into engagement with said ratchet member, and spring means operatively associated with the heel portions of said pawls for repositioning said pawls upon disengagement from said engaged position to said disengaged and retracted position, each pawl being positioned with its associated pivot pin disposed in said slot toward the toe portion when said pawl is in said engaged position and toward the heel portion when said pawl is in said disengaged position.

2. A pawl and ratchet clutch assembly as recited in claim 1 wherein said repositioning means comprises a plurality of torsion springs disposed one per pawl in operative association therewith, each torsion spring having a coiled body, a first leg extending from the coiled body and secured to the pawl support member, and a second leg extending from the coiled body and operatively bearing against the heel portion of its associated pawl.

3. A pawl and ratchet clutch assembly for use in transmitting rotational drive torque from a driving member to a driven member, said pawl and ratchet clutch assembly comprising ratchet means mounted to the drive member, a plurality of pawls mounted to a support member connected to the driven member and disposed circumferentially about said ratchet means and operable in engagement therewith to transmit the rotational drive torque from the driving member to the driven member, each of said pawls having a toe portion, a heel portion, and an elongated slot disposed therebetween, each pawl being supported on a pivot pin extending into said slot for pivotal movement of the toe portion thereof into and out of engagement with said ratchet means and for translation along said slot relative to its pivot pin from a first position whereat the toe portion is rotated inwardly into engagement with said ratchet means to a second position when disengaged whereat the toe portion is rotated outwardly and retracted from said ratchet means, preload means operating against the heel portions of said pawls for biasing the toe portions of said pawls to pivot radially inwardly into engagement with said ratchet member, and spring means operatively associated with the heel portions of said pawls for repositioning said pawls upon disengagement form said engaged position to said disengaged and retracted position, each pawl being positioned with its associated pivot pin disposed in said slot toward the toe portion when said pawl is in said engaged position and toward the heel portion when said pawl is in said disengaged position, said repositioning means comprising a plurality of torsion springs disposed one per pawl in operative association therewith, each torsion spring having a coiled body, a first leg extending from the coiled body and secured to the pawl support member, and second leg extending from the coiled body and operatively bearing against the heel portion of its associated pawl.

* * * * *